(12) United States Patent
Heath et al.

(10) Patent No.: US 8,868,081 B2
(45) Date of Patent: Oct. 21, 2014

(54) SYSTEMS AND METHODS FOR SPEED AND LOCATION BASED NETWORK ACCESS AND FEATURES CONTROL

(75) Inventors: James William Heath, Raleigh, NC (US); Benjamin Charles Levitan, Raleigh, NC (US)

(73) Assignees: Ben Levitan, Raleigh, NC (US); James Heath, Raleigh, NC (US)

( * ) Notice: Subject to any disclaimer, the term of this patent is extended or adjusted under 35 U.S.C. 154(b) by 876 days.

(21) Appl. No.: 13/052,098

(22) Filed: Mar. 20, 2011

(65) Prior Publication Data
US 2012/0238252 A1    Sep. 20, 2012

(51) Int. Cl.
| | |
|---|---|
| H04W 36/00 | (2009.01) |
| H04W 4/02 | (2009.01) |
| H04L 29/06 | (2006.01) |
| H04W 48/04 | (2009.01) |
| H04W 12/08 | (2009.01) |
| H04M 1/725 | (2006.01) |

(52) U.S. Cl.
CPC .............. H04W 4/027 (2013.01); H04W 4/02 (2013.01); H04L 63/102 (2013.01); H04W 12/08 (2013.01); H04W 48/04 (2013.01); H04M 1/72572 (2013.01); H04M 1/72577 (2013.01)
USPC ...................................................... 455/441

(58) Field of Classification Search
USPC ............................................................ 455/441
See application file for complete search history.

(56) References Cited

U.S. PATENT DOCUMENTS

| | | | |
|---|---|---|---|
| 7,302,266 B1 * | 11/2007 | Sill et al. ....................... | 455/441 |
| 2005/0119002 A1 * | 6/2005 | Bauchot et al. ................ | 455/441 |
| 2011/0039581 A1 * | 2/2011 | Cai et al. ....................... | 455/456.4 |

* cited by examiner

Primary Examiner — Joel Ajayi

(57) ABSTRACT

Systems and methods are presented to allow or prohibit any or all services between a network and a node in the network based upon the geographic location and rate of travel of the node. One exemplary application is for the prevention of texting while driving. For example, in FIG. 1: Typical Wireless Communications Network, the location and rate of travel of the mobile station, (MS), 140, can be determined from the use of Global Positioning System, (GPS), information received by the MS, (140), and transmitted to the network. The MS, (140), may have any or all of its subscriber services enabled or disabled by the network based upon the speed that the MS, (140), is traveling and/or its geographical location. Other methods are possible to determine the location and rate of travel of a mobile station as well. In the preferred exemplary embodiment, it is possible for a mobile wireless network to determine the location and speed of an MS. The preferred exemplary embodiment will disallow the operation of features like text messaging or speaking on the mobile phone, when an individual is driving over a range of predetermined speeds. Additionally, this embodiment would disallow the operation of similar features in specific locations, like schools, and jails. In this embodiment it is also possible to allow any MS to access predetermined destinations for emergencies, like 911, at any time. This embodiment also allows services at otherwise forbidden speeds and/or locations to specific MSs or end-users. In this way public safety officials are not restricted and "hotspot" service can be offered on buses or trains. This enhancement to the network would permit more fine-grained control over where and when services can be allowed.

21 Claims, 3 Drawing Sheets

Flow Chart of the Preferred Embodiment of the MS Location and Speed Authentication Process

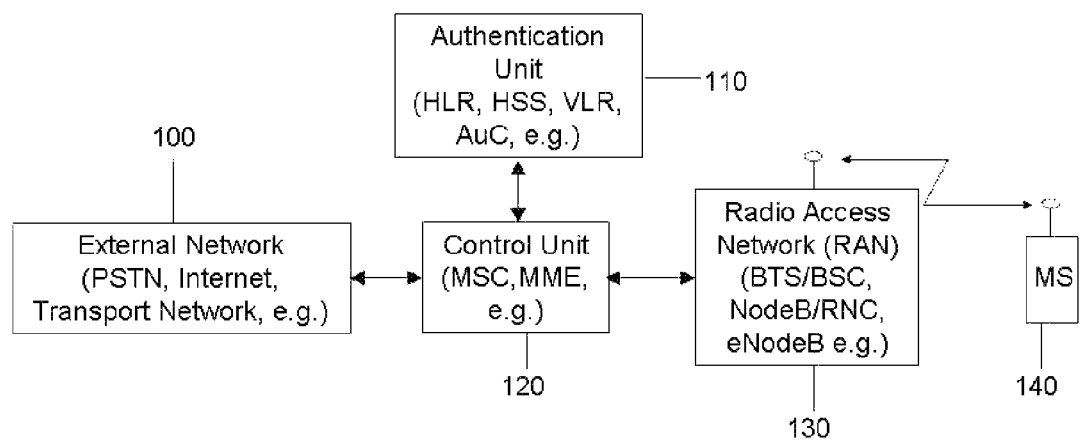
Figure 1: Typical Wireless Communications Network

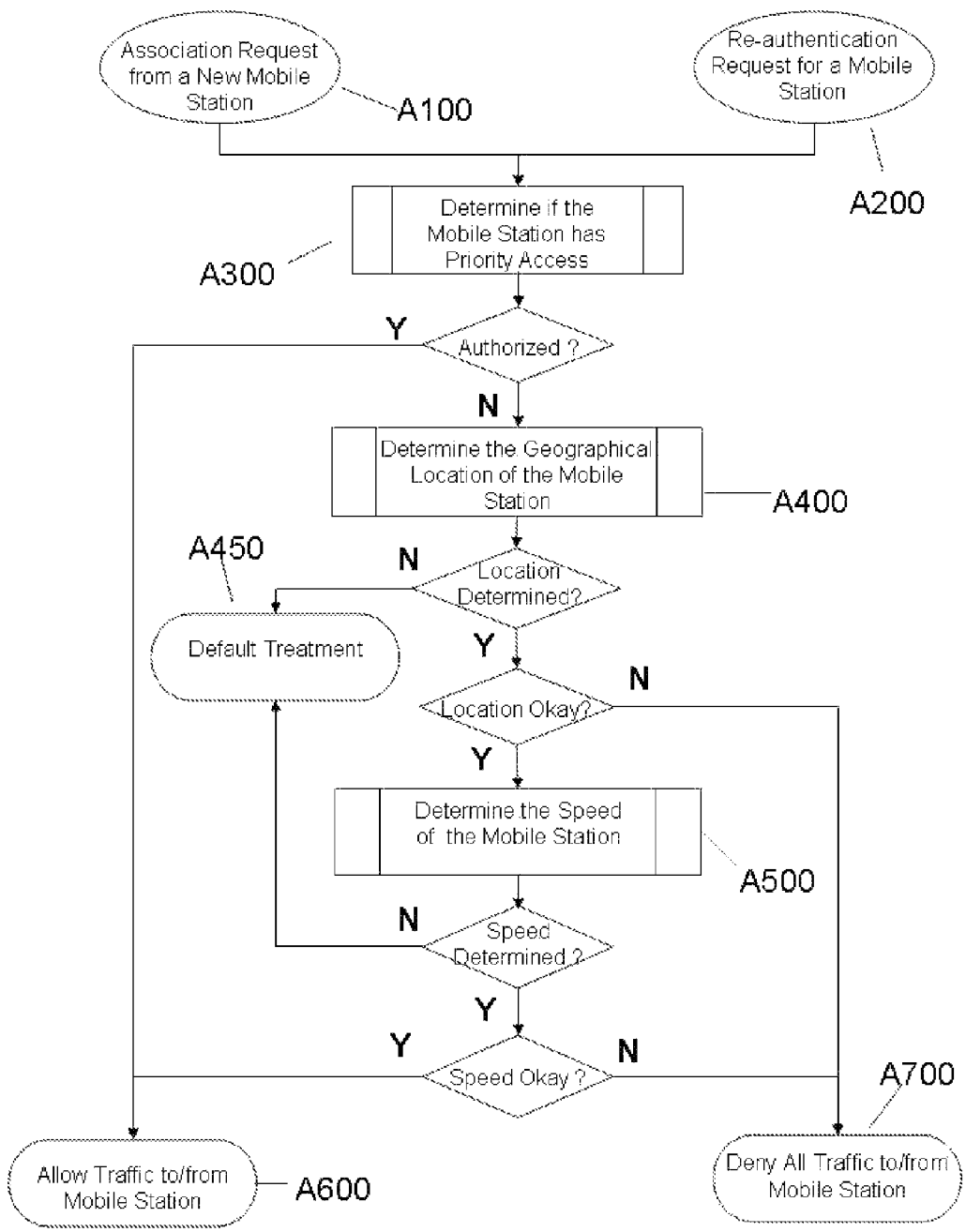
Figure 2: Flow Chart of the Preferred Embodiment of the MS Location and Speed Authentication Process

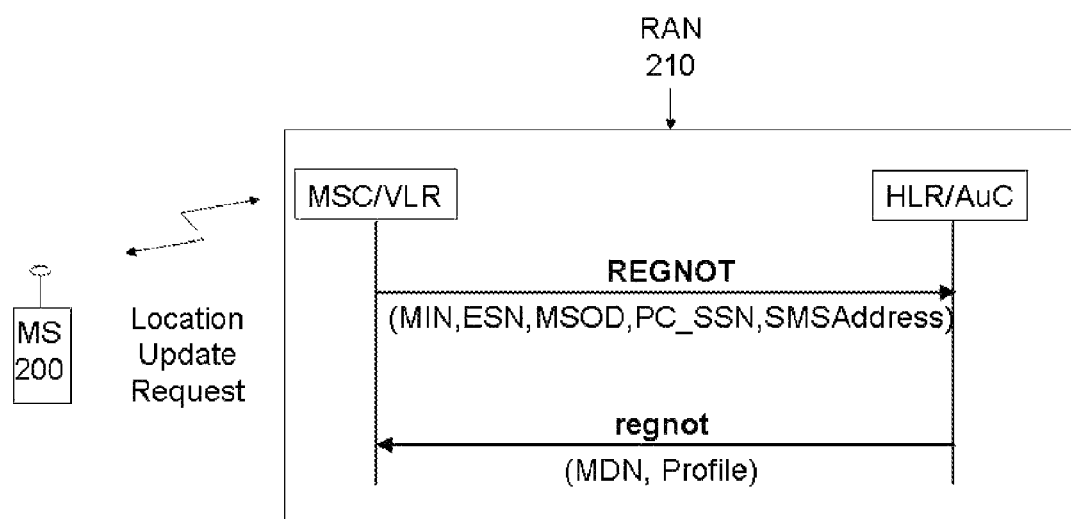
Figure 3: Autonomous Registration Cycle Signaling for a Present Art Wireless Mobile Network

SYSTEMS AND METHODS FOR SPEED AND LOCATION BASED NETWORK ACCESS AND FEATURES CONTROL

REFERENCES CITED

US Patent Applications
2008/0096529 A1 April/2008 Zellner
US Patent Documents
U.S. Pat. No. 5,978,737 November/1999 Pawlowski et al.
U.S. Pat. No. 6,029,110 February/2000 Zuber et al.
U.S. Pat. No. 6,502,022 December/2002 Chastain et al.
U.S. Pat. No. 7,369,845 May/2008 Keohane et al.
U.S. Pat. No. 7,403,773 July/2008 Kappes et al.
U.S. Pat. No. 7,593,712 September/2009 Moton et al.

BACKGROUND

1. Field of Invention

The present invention pertains to communications networks and the control of services to different nodes in the network. More particularly, the present invention relates to a system and method for preventing unauthorized use of services by an end-user based on the end-user's speed and/or location.

2. Description of Related Art

Mobile communications has become exceedingly common with global users reaching 4 Billion and mobile networks reaching the most remote places. Usually these networks provide wireless access through a network of cell towers, but a satellite connection is also possible.

The popularity of mobile phones has led to their use in undesirable places such as schools, and at inappropriate times, such as when driving a car. In the face of mounting evidence of the danger of using mobile communications devices while engage in operating a motor vehicle, many governments have passed laws limiting the use of these devices while driving.

In some instances, government continues to allow "hands free" cell phone usage, but even the act of engaging in a telephone conversation while driving increases the risk of an accident. This is because the human brain will develop tunnel vision as it subconsciously tries to envision the face of the person they are talking to. In other jurisdictions use of such communications devices is forbidden completely while driving, but enforcement is difficult, at least until after an accident has occurred.

Likewise the use of cell phones and other mobile communications devices in forbidden places is hard to enforce. Teachers struggle every day with inappropriate use by students. Correctional facilities have a great law enforcement concern about mobile communications devices in prisons allowing convicts to continue to operate their criminal enterprises while behind bars.

The basis of this present invention is the application of the location and speed information acquired from the cell phone itself. Using the cell phone's location it is possible to limit or eliminate services in undesirable places. By using the velocity of the cell phone it is possible to separate the person walking on the street from the person driving on the street.

Cell phones have had GPS sensors installed in them since 1999, which would provide the location and speed of the cell phone. Sometimes the cell phone is in a location where GPS will not work due to the interference between the GPS satellites and the cell phone. In these instances it is possible to use information from the signals received from the cell phone, such as time of arrival or the strength of the received signal, to calculate the location and/or speed of the cell phone.

This present invention assumes that a test of the cell phone's location or its speed will be in addition to the normal authentication that occurs when a cell phone is powered up and is allowed to attach to the network. It is assumed that a device so attached will continue to operate in the same manner as it presently does when the cell phone is idle. That is to say, it continues to be in contact with the network on a regular basis, updating its location and speed as well as the cell tower it is communicating with. This will allow the network to route a call or connection request to it when allowed.

The difference this present invention introduces is that before a cell phone, or any other type of mobile communications device, can allow subscriber services, the location and speed of the cell phone is checked against a table of allowable values. If the location indicates that the cell phone is currently in a forbidden location, or the speed indicates that the cell phone is traveling too fast, any or all services, may be denied to the cell phone.

Emergency calls by the end-user would be largely unchanged by this present invention. The present invention includes emergency override ability so that an end-user can make an emergency call, like one for 911 services. This emergency override request is identified by the destination the cell phone or other mobile communications device is attempting to reach.

Public safety or emergency personnel need to operate mobile services often in locations or at speeds that would be forbidden to the general user by this present invention. The present invention also includes override ability for specific network users. This override ability will be granted based on the actual communications device, like a laptop bolted to the dashboard of a police cruiser, or through a process which authenticates the end-user by something like a password, token or some form of biometric identification. This type of override ability would allow access to any or all services even when the mobile communications device is in a forbidden location or traveling at a forbidden speed.

The override ability can work in the other direction as well. Sometimes in an emergency, a first responder may want to contact an attached cell phone or mobile communications device even when it is in a forbidden location or traveling at a forbidden speed. This may be used generically to inform a group of people who are moving of a hazard ahead such as a tornado, or to contact a single individual who is traveling.

Another use for this override ability is to set up a "hotspot" on a bus or train. This "hotspot" is authorized to receive subscriber services and provide them to attached "hotspot" users at speeds or in locations not possible for non-passengers of the bus or train. The network would determine a cell phone's speed relative to the "hotspot", indicating that the cell phone is being used by a public transit passenger. The network could then allow all or some services to the bus passenger.

In no way does the above description of how the invention may be used or applied in any way limit the generality of the invention or its application. It is entirely possible that a stationary network node may also have its services availability determined by its location and speed. There also may be many ways besides GPS to determine the location and speed of a cell phone or any other node, and this invention includes all of them.

SUMMARY OF INVENTION

It is the object of the present invention to address one or more of the drawbacks of the present art.

These and other objects are accomplished by a System pertaining to, and methods of operating a mobile wireless communications network, which prevents unauthorized users from accessing the wireless communications network.

The normal process a mobile station follows when it registers with a mobile network is not affected by this present invention, nor is the normal process followed by a registered mobile station to remain attached to the wireless communications network. This normal procedure includes periodic updates of the base station, NodeB, or eNodeB that a mobile station is connected to.

The present invention adds another authentication process to the normal processes for registering to the network and remaining an attached mobile station. The location and/or speed of a mobile station is measured when the mobile station registers with a mobile communication network or is measured periodically after a mobile station has been registered and is still attached. If the location and/or speed of a mobile station falls within a predetermined range of values, the system concludes that the mobile station is being operated in a moving vehicle or in a forbidden location, and bars some or all of the services provided by the wireless communications network.

The system may authenticate the mobile station or the user of the mobile station and allow said mobile station or said user to access some or all of the services provided by the wireless communications network even should said mobile station have location and/or speed measurements that fall within the predetermined range of values where these services would normally be restricted. In this manner, public safety officials can maintain access to the wireless communications network while operating motor vehicles and wireless "hotspot" access can be provided to trains and buses for commuters on public transit. Also end-users may be contacted in an emergency.

Further, all mobile devices may place emergency calls without authorization, or restriction of service.

The system periodically measures the location and/or speed of the mobile station to verify that authorized stations remain within the authorized geographical area and at an authorized speed. A mobile station which has moved outside the authorized area or begun to travel at an unauthorized speed can be notified or denied further access to any or all the services offered by the wireless communications network.

BRIEF DESCRIPTION OF THE DRAWINGS

FIG. 1: Typical Wireless Communications Network
FIG. 2: Flow Chart of the Preferred Embodiment of the MS Location and Speed Authentication Process
FIG. 3: Autonomous Registration Cycle Signaling for a Present Art Wireless Mobile Network

DETAILED DESCRIPTION OF INVENTION

Preferred Exemplary Embodiment

Description

A block diagram of a wireless communications network is shown in FIG. 1: Typical Wireless Communications Network. This shows a Mobile Station, (MS), 140, connected through a wireless connection to a Radio Access Network, (RAN), 130. A few common examples of a mobile station are radio telecommunications handsets, smartphones, or laptops. A few common examples of RAN are BTS/BSC pairs in 2G networks, NodeB/RNC pairs in 3G networks and eNodeBs in 4G networks.

The RAN is connected to the Control Unit, 120, which controls access between the radio access network represented by the RAN, and external networks, 100, such as the Public Switched Telephone Network, (PSTN), the Internet, or some sort of long haul transport network. Examples of a control unit include a Mobile Service Switch, (MSC), a soft switch, or a Mobile Management Entity, (MME).

The Control Unit checks with Authentication Unit, 110, for each access request initiated between the external network and the RAN, except for emergency calls, like those to 911 service, which are given priority access under all circumstances. Currently the Authentication Unit, 110, checks the validity of the user in some database, like the Home Location Register, (HLR), or the Visitor Location Register, (VLR), Home Subscriber Service, (HSS) or Authentication Center, (AuC), to ensure the user is allowed services on the wireless communications network and to detail the services the end-user is approved for.

FIG. 2: Flow Chart of the Preferred Embodiment of the MS Location and Speed Authentication Process shows the flow chart detailing a few new procedural steps and new parameter values that are added in this exemplary embodiment to a typical wireless communications network's current initiation process and its regular registration update process. The modified process in this exemplary embodiment will receive from the RAN all the existing signals, parameters and traffic needed to set up and maintain a communications connection between an MS, 140, and the rest of the network and in addition will also receive information on the current geographic location and the current speed of the MS, 140, at regular intervals and at initiation of any connection request.

The current location and speed information can be gained by a number of means such as GPS readings from the MS, 140, or triangulation methods employing multiple radio signals. In essence the Control Unit, 120, would regularly check that the MS, 140, was located in an allowed location, and that the MS, 140, was traveling at an allowed speed. In this exemplary embodiment a step is added, step A450 in FIG. 2, to handle the circumstances should it not be possible to ascertain the current location or speed of the MS. In this exemplary embodiment the default process, A450, is unspecified, but may include refusing service to the MS, 140, or perhaps just treating it like it is stationary.

In this exemplary embodiment the authentication process for the MS, 140, is in addition to all of the regular authentication processes that take place to associate an MS, 140, to the wireless communications network.

Systems override authentication, authorization and restrictions for 911 emergency calls (or equivalent) and the location/speed process detailed in this exemplary embodiment in FIG. 2, would similarly be overridden for such calls.

Wireless networks may provide services to certain classes of mobile stations or certain classes of users. This exemplary embodiment includes a process, A300, to provide priority service. This priority service may be offered to police, fire and other public officials to assure wireless service during emergencies. This extra authentication process may occur before, after, or during the regular authentication processes. Certain mobile devices may be shown in the system database to have a form of priority service. In such cases, a process to allow network priority is granted and the system can be configured to override location or speed restrictions as well. Another method is to allow an emergency worker to use any mobile regardless if it has been registered by entering certain "priority codes". In this case, location or speed restrictions would be overridden as well.

There are many ways to implement the authentication process. FIG. 2: Flow Chart of the Preferred Embodiment of the MS Location and Speed Authentication Process shows an exemplary embodiment of the flow chart of the authentication process. In this exemplary embodiment of a process the authentication of an association request requires three steps:

1. MOO that checks if the MS, 140, or user has priority override authority.
2. A400 that checks if the MS location is forbidden.
3. A500 that checks if the MS speed is forbidden.

There are many ways to arrange the order of the three authentication steps shown in FIG. 2. Certainly the authentication steps checking the location and the speed of the MS can be interchanged. A person skilled in the art can come up with many alternate embodiments of this process by changing the order of these steps and perhaps repeating one or more of these steps.

Theory of Operation

Association Authentication Process

With reference to the flow chart in FIG. 2: Flow Chart of the Preferred Embodiment of the MS Location and Speed Authentication Process the operation of the system components of the association authentication process, in accordance with the present invention, will be described. In this exemplary embodiment Step A100 is after the completion of the normal association request for an MS to a wireless communications network that occurs when the MS is powered up. An association request from an MS wishing to connect to the wireless communications network is received during the process of an MS requesting to gain access to the network. This request is received by the RAN from the MS and passed to the Control Unit along with the location and speed of the MS.

In step A300, the MS is checked to see if the MS has priority status, or if the user initiates a request for priority status, the user's identity and authority are authenticated. This priority status allows the MS to operate in locations or at speeds that are forbidden for most users. If priority status is granted this authentication process proceeds to step A600 and all traffic between the MS and the External Networks is allowed for a period of time until the re-authentication process is initiated.

This priority override capability might be general or specific to the user. In the former, perhaps a priority override allows operation of the MS in all forbidden locations and/or at all forbidden speeds. However an override status might be specific to a particular MS or end-user and allow operation in only at some of the forbidden locations or at some of the forbidden speeds. In addition an emergency call from the MS, like a 911 call, would also override location and speed restrictions on the MS.

Step A300 may check that the actual MS is given priority status, based on a signal from the MS, or the Mobile Identification Number (the phone number is many cases), the Electronic Serial number (a world wide unique ID for this phone) or some such other identifying feature that is checked against a table of MS's given priority status. These classes of devices might be MS's mounted on the dashboard of a police vehicle and this priority status allows the functioning of the MS even when the police vehicle is moving or located in forbidden locations.

Another class of MS's given this priority status might be wireless access points mounted in public transit vehicles like buses or trains. This would allow things like WiFi hotspots to be set up, allowing commuters on public transit access while still denying access to commuters traveling in private vehicles.

Step A300 may allow the end-user of the MS to claim priority status using some sort of personal verification process such as passwords, tokens, or bio-metrics. This would allow, for example, a public safety official to use any MS to provide communications while traveling at forbidden speeds or in forbidden locations.

And finally, step A300 would recognize an emergency call by the destination the MS is trying to reach, like a 911 call. This override capability would be allowed for all attached MS's.

If the MS or end-user does not have priority status, then the process proceeds to step A400. In this step the location information for the MS is determined and then examined against a stored list of allowed or forbidden locations. If the location of the MS cannot be ascertained the process proceeds to step A450.

Step A450 is a default process followed by the operator of the wireless communications network when it is not possible to get the location of the MS. In this exemplary embodiment the default process is not specified.

In step A400, if the MS is in a forbidden location the process proceeds to step A700 and all access to traffic or services between the MS, and the rest of the network beyond those needed to keep the MS attached, may be limited or denied for a period of time until the re-authentication process is initiated.

The MS may be refused service, but remains actively connected to the RAN. It is possible that during a re-authentication process it would be found that the denied MS had moved into an allowed location and could now be allowed access to the full range of network services it is approved for by the Authentication Unit, 110 of FIG. 1: Typical Wireless Communications Network.

If the MS is in an allowed location the process proceeds to step A500. In this step the speed of the MS is determined and examined against a list of allowed or forbidden speeds. If the location of the MS cannot be ascertained the process proceeds to step A450, which was described previously.

In step A500, if the MS is traveling at a forbidden speed the process proceeds to step A700 and all access to traffic or services between the MS, and the rest of the network beyond those needed to keep the MS attached, may be limited or denied for a period of time until the re-authentication process is initiated.

In this step, as in step A400, the MS may be refused service but remain actively connected to the RAN, and the wireless communications network may be aware that these "restricted" MS's are attached through data bases like the HLR/VLR or the HSS. It is possible that during the re-authentication process it would be found that the denied MS was now traveling at an allowed speed and could now be allowed access to a greater range of network services up to all those services it is approved for by the Authentication Unit, 110 of FIG. 1: Typical Wireless Communications Network.

If the MS is traveling at an allowed speed the process then proceeds to step A600 and any or all traffic to and from the MS is allowed for a period of time until the re-authentication process is initiated.

Periodic Re-authentication Process

A diagram of a present art registration process for a typical wireless communications network is shown in FIG. 3: Autonomous Registration Cycle Signaling for a Present Art Wireless Mobile Network. In a regular 2G, 3G, or 4G wireless communications network the location of the MS, 200, must be kept up to date, so that the network knows which RAN, 210, the MS, 200, is connect to so as to insure if a connection request comes for the MS at the Control Unit, it knows where to route the traffic.

Autonomous Registration is the most common requirement that an MS update its registration at regular intervals. When the update is sent, (REGNOTE in FIG. 3), from the MS, 200, a series of parameters, in addition to the RAN, 210, that the MS, 200, is connected to, are also sent to update the authentication data bases like the HLR or HSS.

This exemplary embodiment utilizes the existing wireless communications network standards and also requires all MS's upon registration for any reason to also supply information concerning the MS's location and speed.

The re-authentication process is called periodic because at some interval the process is initiated. The exact interval may be set by the network operator and does not affect the re-authentication process, but Autonomous Registrations done by the existing wireless communications networks are at 3 minute intervals.

This process is periodically launched to both check whether MS's that were given network access are still in allowed locations and still traveling at allowed speeds and also to check whether MS's denied network access due to their location or speed may now be in an allowed location or traveling at an allowed speed and can therefore be allowed greater network access.

With reference to the flow chart in FIG. 2: Flow Chart of the Preferred Embodiment of the MS Location and Speed Authentication Process the operation of the system components of the re-authentication process in this exemplary embodiment will be described.

Step A200 is the beginning of the re-authentication process. In this exemplary embodiment the re-authentication process proceeds to step A300, then possibly steps A400 and A500 just like what was described in the Association Authentication Process previously.

So network access is controlled based on the most recent MS location and speed when the re-authentication process took place. This re-authentication process will be initiated whether the MS is idly connected to the network or whether it is in active use. The process will usually operate in the background without the MS or end-user being aware, although in this embodiment a message or other indication is sent to the MS informing it whether service is available or unavailable. This indication may be sent at the end of the Association Authentication process as well.

Connection Request from the MS

In FIG. 1: Typical Wireless Communications Network, when a connection request comes from the MS, 140, to the Control Unit, 120, to connect to another user or node on the network, all the parameters concerning the MS, 140, are checked to see if it is allowed access. If it is, the connection is allowed to proceed. If however, the MS, 140, is deemed to be in a forbidden location or traveling at a forbidden speed the connection request is denied, and a message or other indication may be sent to the locally connected MS.

Connection Request to the MS

In FIG. 1: Typical Wireless Communications Network, if a connection request comes from another user or node on the network to the Control Unit, 120, to connect to a locally attached MS, 140, if the MS, 140, is allowed access the connection is made. If however, the MS, 140, is deemed in a forbidden location or traveling at a forbidden speed the connection request is denied, but the message can be stored for the MS, 140, to view later, at the request of the connection request initiator and a message or other indication may be sent to the connection request initiator or to the locally connected MS, 140, or both.

Notification to a Denied MS

In FIG. 1: Typical Wireless Communications Network, this preferred exemplary embodiment contains a feature that would notify the MS, 140, if network access were denied due to its location and/or its speed. Also a message would be sent to the connection request initiator, if the connection request came from another user or node on the network, informing the initiator that the MS, 140, is either in a forbidden location and/or traveling at a forbidden speed. Also a message would be sent to the destination MS, 140, informing them that someone had tried to contact them but was refused due to either their location or speed of travel.

Message Storm for a Denied MS

In FIG. 1: Typical Wireless Communications Network, this preferred exemplary embodiment contains a feature that would allow the connection request initiator to store a message for an MS, 140, should the initiator's connection request be denied because the MS, 140, was either in a forbidden location and/or traveling at a forbidden speed. A message or indication signal may be sent to the denied MS, 140, informing the end-user that a request has been stored and perhaps who the initiator was.

Second Exemplary Embodiment

The second exemplary embodiment is the same as the preferred embodiment except that the authentication process exemplified by FIG. 2 may take place in the MS itself.

Third Exemplary Embodiment

The third exemplary embodiment is the same as the preferred embodiment except that the authentication override process is general only. That is an MS or end-user if granted override status can operate in any location and at any speed of travel.

Fourth Exemplary Embodiment

The fourth exemplary embodiment is the same as the preferred embodiment except that should a connection request to an MS be refused because the MS is either in a forbidden location and/or traveling at a forbidden speed, the message cannot be stored to view later.

CONCLUSION

It is apparent to those skilled in the art that various modifications and variations can be made to the present invention without departing from the spirit and scope of the invention. Possible modifications and variations include, but are not limited to:

1) Only authenticating the location of the MS.
2) Only authenticating the speed of travel of the MS.
3) Not allowing priority override of the authentication of the location and/or speed of travel of the MS.
4) Re-arranging the order of the steps of the process of authentication of priority override status, location status, or speed status.
5) Combining restrictions with other subscriber parameters such as age.
6) Combining restrictions with other factors such as time of day and/or day of the week.

7) Combining restrictions with other factors such as type of equipment being used. A GPS device may be permitted to receive traffic updates.
8) Not notifying the originator that the connection was refused because the MS was in a forbidden location or traveling at a forbidden speed.
9) Using different types of commercially available network technology, like for example, GSM, CDMA, UMTS, EVDO, Wimax, LTE, or WiFi.

Thus, it is intended that the present invention cover the modifications and variations of this invention provided they come within the scope of the appended claims and their equivalents.

We claim:

1. A method for use in a cell phone network comprising:
   a. A Short Message Service Center (SMSC) receiving a text message or Short Message Service (SMS) for delivery to a mobile station (MS);
   b. The SMSC querying the Home Location Register (HLR) of the MS for routing information;
   c. The SMSC receiving the routing information for the MS for SMS Mobile Terminated Operation;
   d. The SMSC sending the SMS to the Mobile Serving Switch (MSC) using the ForwardShortMessage operation (FSM);
   e. The MSC retrieving the subscriber information from the Visitor Location Register, (VLR);
   f. The MSC sending the Location Services, (LCS), query requesting the InterSystemPOSitionREQuest, (ISPOSREQ), and, including in the query a request for Position Quality of Service information, (PQOS); specifically, the ISPOSREQ query will include parameters requesting the PQOS parameter of Horizontal Velocity measurement be returned in the response to the ISPOSREQ query;
   g. The MS including the PQOS' Horizontal Velocity measurement in its response to the Location Services' ISPOSREQ query;
   h. The MSC receiving the PQOS parameters from the MS that includes Generalized Time, Geographic Position, Position Source, Horizontal Velocity and Vertical Velocity;
   i. The MSC comparing the received Horizontal Velocity to a predetermined maximum value for velocity;
   j. The MSC initiating "SMS Mobile Terminated Delivery Unsuccessful" procedures when the Horizontal Velocity returned to the MSC from the MS in its response to the ISPOSREQ query exceeds the predetermined value; and,
   k. The MSC allowing SMS Mobile Terminated (SMS-MT) delivery to be processed when the Horizontal Velocity returned to the MSC from the MS in its response to the ISPOSREQ query does not exceed the predetermined value.

2. The method as in 1) where there are further steps comprising:
   a. Short Message Service Center (SMSC) receiving a text message or Short Message Service (SMS) from an MS that is originating an SMS message for delivery;
   b. The MSC sending the Location Services, (LCS), query requesting the InterSystemPOSitionREQuest, (ISPOSREQ), and, including in the query a request for Position Quality of Service information, (PQOS) to this source MS that is originating the SMS message; specifically, the ISPOSREQ query will include parameters requesting the PQOS parameter of Horizontal Velocity measurement be returned in the response to the ISPOSREQ query;
   c. The source MS including the PQOS' Horizontal Velocity measurement in its response to the Location Services' ISPOSREQ query;
   d. The MSC receiving the PQOS parameters from the source MS that includes Generalized Time, Geographic Position, Position Source, Horizontal Velocity and Vertical Velocity;
   e. The MSC comparing the received Horizontal Velocity to a predetermined maximum value for velocity;
   f. The MSC initiating "SMS Mobile Originated Delivery Unsuccessful" procedures when the Horizontal Velocity returned to the MSC from the source MS in its response to the ISPOSREQ query exceeds the predetermined value; and,
   g. The MSC allowing SMS Mobile Originated (SMS-MO) delivery to be processed when the Horizontal Velocity returned to the MSC from the source MS in its response to the ISPOSREQ query does not exceed the predetermined value.

3. The method as in 1) wherein there are further steps comprising:
   a. The MSC sending the Location Services, (LCS), query requesting the InterSystemPOSitionREQuest, (ISPOSREQ), and, including in the query a request for Position Quality of Service information, (PQOS); specifically, the ISPOSREQ query will include parameters requesting the PQOS parameter of Geographic Position measurement be returned in the response to the ISPOSREQ query;
   b. The MS including the PQOS' Geographic Position measurement in its response to the Location Services' ISPOSREQ query;
   c. The MSC receiving the PQOS parameters from the MS that includes Generalized Time, Geographic Position, Position Source, Horizontal Velocity and Vertical Velocity;
   d. The MSC comparing the received Geographic Position to a predetermined table of allowable geographic positions;
   e. The MSC initiating "SMS Mobile Terminated Delivery Unsuccessful" procedures when the Geographic Position returned to the MSC from the MS in its response to the ISPOSREQ query is not an allowable location; and,
   f. The MSC allowing SMS Mobile Terminated (SMS-MT) delivery to be processed when the Geographic Position returned to the MSC from the MS in its response to the ISPOSREQ query is an allowable location.

4. The method as in 2) wherein there are further steps comprising:
   a. The MSC sending the Location Services, (LCS), query requesting the InterSystemPOSitionREQuest, (ISPOSREQ), and, including in the query to the source MS a request for Position Quality of Service information, (PQOS), Specifically, the ISPOSREQ query will include parameters requesting the PQOS parameter of Geographic Position measurement be returned in the response to the ISPOSREQ query;
   b. The source MS including the PQOS' Geographic Position measurement in its response to the Location Services' ISPOSREQ query;
   c. The MSC receiving the PQOS parameters from the source MS that includes Generalized Time, Geographic Position, Position Source, Horizontal Velocity and Vertical Velocity;
   d. The MSC comparing the received Geographic Position to a predetermined table of allowable geographical positions;

e. The MSC initiating "SMS Mobile Originated Delivery Unsuccessful" procedures when the Geographic Position returned to the MSC from the source MS in its response to the ISPOSREQ query is not an allowable location; and, f. The MSC allowing SMS Mobile Originated (SMS-MO) delivery to be processed when the Geographic Position returned to the MSC from the source MS in its response to the ISPOSREQ query is an allowable location.

5. The method as in 1) wherein there are further steps comprising:
   a. The MSC checking the identity of the MS, or the MS' user against a predetermined list of authorized identities before step f);
   b. The MSC initiating steps f) to k) when the identity of the MS device or its user is not authorized; and,
   c. The MSC allowing SMS Mobile Terminated (SMS-MT) delivery to be processed when the identity of the MS device or its user is authorized.

6. The method as in 2) wherein there are further steps comprising:
   a. The MSC checking the identity of the source MS, or the source MS' user against a predetermined list of authorized identities before step b);
   b. The MSC initiating steps b) to g) when the identity of the source MS device or its user is not authorized; and,
   c. The MSC allowing SMS Mobile Originated (SMS-MO) delivery to be processed when the identity of the source MS device or its user is authorized.

7. The method as in 1) wherein the SMSC is replaced with a Service Control Point, (SCP), and the attempted communications is a voice call setup request.

8. The method as in 2) wherein the SMSC is replaced with a Service Control Point, (SCP), and the attempted communications is a voice call setup request from the source MS.

9. The method as in 3) wherein the SMSC is replaced with a Service Control Point, (SCP), and the attempted communications is a voice call setup request.

10. The method as in 4) wherein the SMSC is replaced with a Service Control Point, (SCP), and the attempted communications is a voice call setup request from the source MS.

11. The method as in 5) wherein the SMSC is replaced with a Service Control Point, (SCP), and the attempted communications is a voice call setup request.

12. The method as in 6) wherein the SMSC is replaced with a Service Control Point, (SCP), and the attempted communications is a voice call setup request from the source MS.

13. The method as in 1) wherein the SMSC is replaced with a Packet Data Gateway, (PGW), and the attempted communications is an Internet setup request.

14. The method as in 2) wherein the SMSC is replaced with a Packet Data Gateway, (PGW), and the attempted communications is an Internet setup request from the source MS.

15. The method as in 3) wherein the SMSC is replaced with a Packet Data Gateway, (PGW), and the attempted communications is an Internet setup request.

16. The method as in 4) wherein the SMSC is replaced with a Packet Data Gateway, (PGW), and the attempted communications is an Internet setup request from the source MS.

17. The method as in 5) wherein the SMSC is replaced with a Packet Data Gateway, (PGW), and the attempted communications is an Internet setup request.

18. The method as in 6) wherein the SMSC is replaced with a Packet Data Gateway, (PGW), and the attempted communications is an Internet setup request from the source MS.

19. A Method for use in a cell phone network comprising:
   a. A Mobility Management Entity, (MME), receiving a SERVICE REQUEST from a Mobile Station, (MS);
   b. The MME employing the LTE Position Protocol, (LPP), to request the Horizontal Velocity parameter from the MS through the Enhanced Serving Mobile Location Centre, (E-SMLC);
   c. The MS including the Horizontal Velocity measurement in its response to the LTE Position Protocol's queries from the E-SMLC;
   d. The MME receiving the value of Horizontal Velocity parameter from the E-SMLC;
   e. The MME comparing the received Horizontal Velocity to a predetermined maximum value for velocity;
   f. The MME initiating "Service Reject" procedures when the Horizontal Velocity returned to the MME from the MS in its response to the LPP query exceeds the predetermined value; and,
   g. The MME allowing the service request to be processed when the Horizontal Velocity returned to the MME from the MS in its response to the LPP query does not exceed the predetermined value.

20. The method as in 19) wherein there are further steps comprising:
   a. The MME employing the LTE Position Protocol, (LPP), to request the Geographic Position parameter from the MS through the Enhanced Serving Mobile Location Centre, (E-SMLC);
   b. The MS including the Geographic Position measurement in its response to the LTE Position Protocol's queries from the E-SMLC;
   c. The MME receiving value of Geographic Position parameter from the E-SMLC;
   d. The MME comparing the received Geographic Position to a predetermined table of allowable geographic positions;
   e. The MME initiating "Service Reject" procedures when the Geographic Position returned to the MME from the MS in its response to the LPP query is not an allowable location; and,
   f. The MME allowing the service request to be processed when the Geographic Position returned to the MME from the MS in its response to the LPP query is an allowable location.

21. A method as in 19) wherein there are further steps comprising:
   a. The MME checking the identity of the MS, or the MS' user against a predetermined list of authorized identities before step b);
   b. The MME initiating steps b) to g) when the identity of the MS device or its user is not authorized; and,
   c. The MME allowing the service request to be processed when the identity of the MS device or its user is authorized.

* * * * *